United States Patent [19]

Rumer, Jr. et al.

[11] 4,082,029

[45] Apr. 4, 1978

[54] OPTICAL METRONOMES

[75] Inventors: David Orville Rumer, Jr., Rockford; Donald James Findlay, Wheeling; Arthur E. Neumann, Winnetka, all of Ill.; Juan M. Del Castillo, Risco No. 119, Mexico City, Mexico, 20

[73] Assignee: Juan M. Del Castillo, Mexico City, Mexico

[21] Appl. No.: 722,283

[22] Filed: Sep. 10, 1976

[51] Int. Cl.[2] ......................... G04F 5/02; G09B 15/02

[52] U.S. Cl. ......................................... 84/484; 362/31

[58] Field of Search ................ 84/484, 470; 240/1 EL

[56] References Cited

U.S. PATENT DOCUMENTS

| | | | |
|---|---|---|---|
| 2,619,068 | 11/1952 | Malheiros et al. ............ | 250/1 EL X |
| 3,737,644 | 6/1973 | Nocek et al. ................. | 240/1 EL X |
| 3,945,292 | 3/1976 | Del Castillo ........................... | 84/484 |
| 3,996,833 | 12/1976 | Del Castillo ........................... | 84/484 |
| 4,014,167 | 3/1977 | Hasegawa et al. ................ | 84/484 X |

*Primary Examiner*—Lawrence R. Franklin

*Attorney, Agent, or Firm*—Karl W. Flocks

[57] ABSTRACT

An optical metronome using sheets of music of non-sagging sheets of translucent material with notes spaced according to their value and vertically aligned measures on a display panel of light columns formed of vertical bars of triangular cross-section in white reflectors with an angular air gap and a light source for each bar. Circuitry coordinates sequential lighting of the bars in proper musical tempo and properly placed downbeat and is also attached or attachable to electronic organ circuitry or stands alone with automatic turn-off of lights to the bars if organ not counting.

9 Claims, 19 Drawing Figures

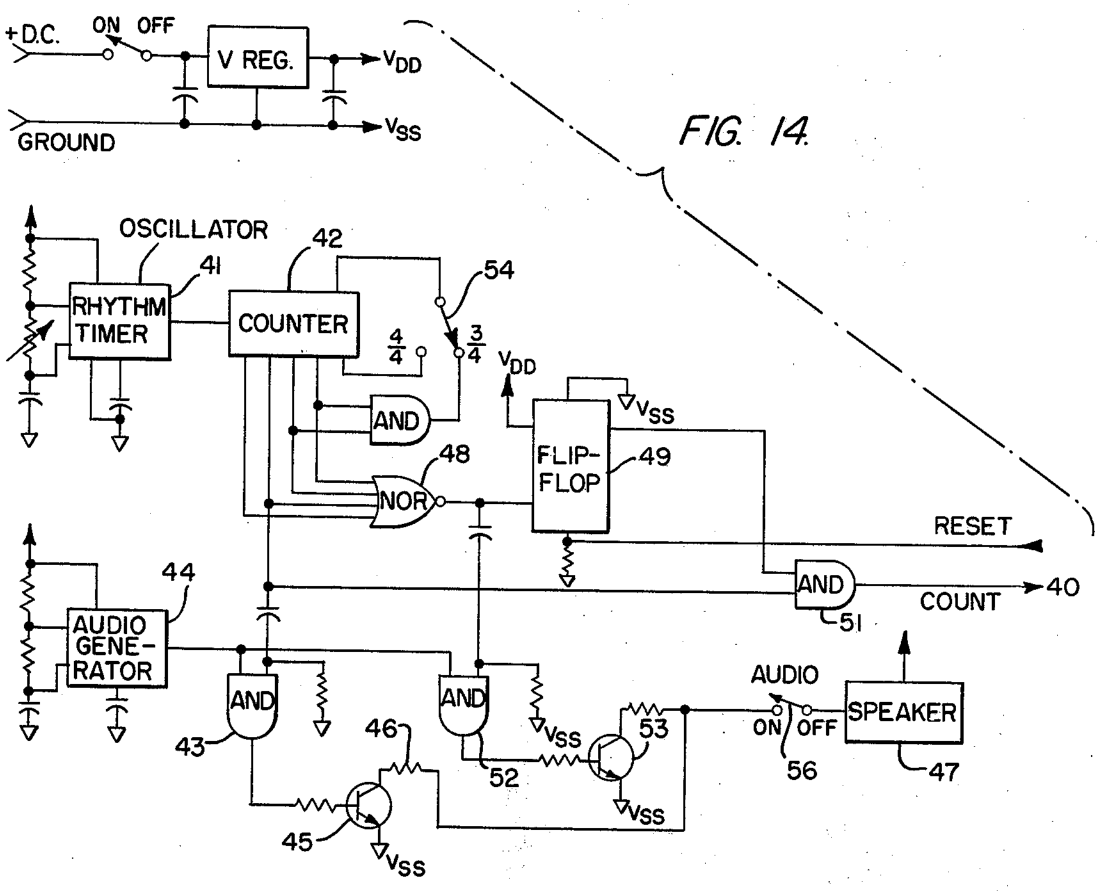
FIG. 14.
FIG. 15.
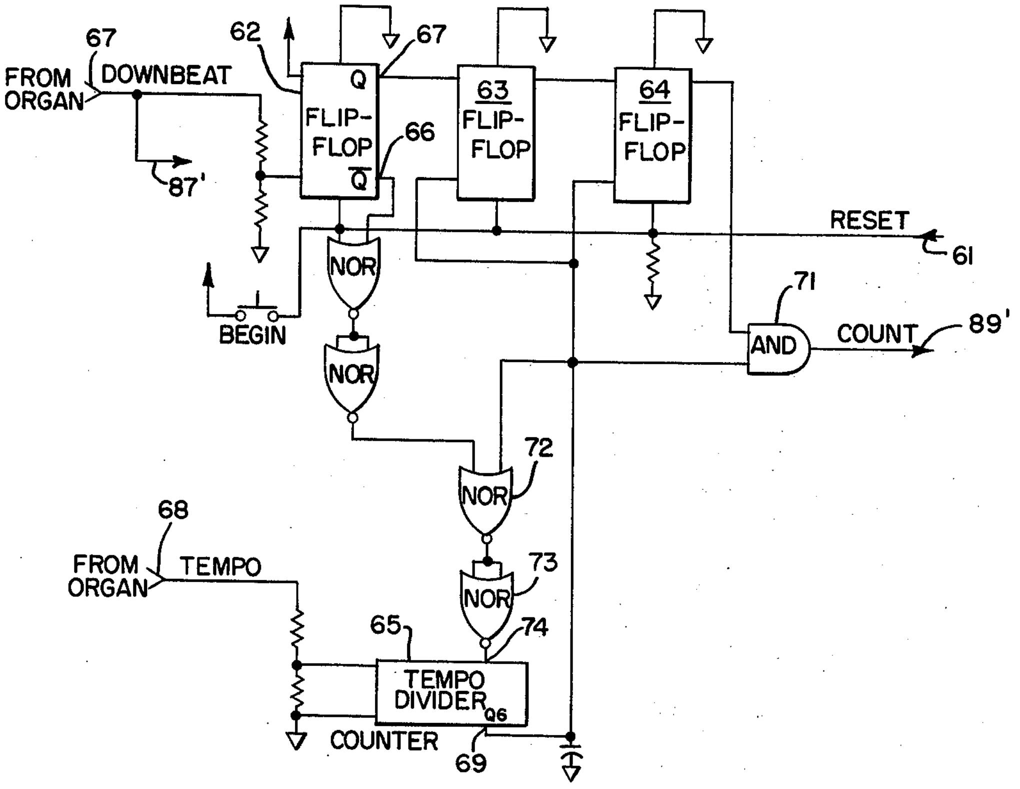

OPTICAL METRONOMES

BACKGROUND OF THE INVENTION

The present invention relates to optical metronomes for displaying the correct tempo relative to the notes on a sheet of music.

The electronic organ has various rhythm patterns generated in the organ circuitry and a means to aid the player in matching his tempo with the rhythm patterns produced by the organ is needed. Also means is needed to properly place a downbeat in the measure and avoid forcing a downbeat to occur improperly relative to any music scanning device.

SUMMARY OF THE INVENTION

It is an object of the present invention to optically indicate the tempo on a sheet of music by lighted columns behind the sheet.

It is another object of the present invention to use columns of limited height and maximum light reflectance.

A further object is to produce the columns of light through use of triangular cross-sectional vertical bars nested in a reflector with an air gap between bar and reflector.

It is still further an object of the present invention to coordinate the circuitry of the light bars with the circuitry of electronic musical instruments for proper placement of the downbeat.

It is an object to coordinate circuitry of an electronic organ with the tempo displayed by the light bars.

It is a further object to use liquid crystal displays to indicate the notes on the sheet of music to be played.

Still a further object is to display the musical notes on a translucent plastic sheet which is self-supporting so as to be non-sagging in the optical metronome for accuracy of placement before the light columns with spacing from the columns for focussing of the light on the sheet to clearly define the light bar limits.

BRIEF DESCRIPTION OF THE DRAWINGS

The above and other objects and advantages of the invention will become apparent upon full consideration of the following detailed description and accompanying drawings in which:

FIG. 14 is a circuit diagram of a display panel driver circuit;

FIG. 15 is a circuit diagram of an organ interface circuit;

DESCRIPTION OF THE PREFERRED EMBODIMENTS

Figure 1:
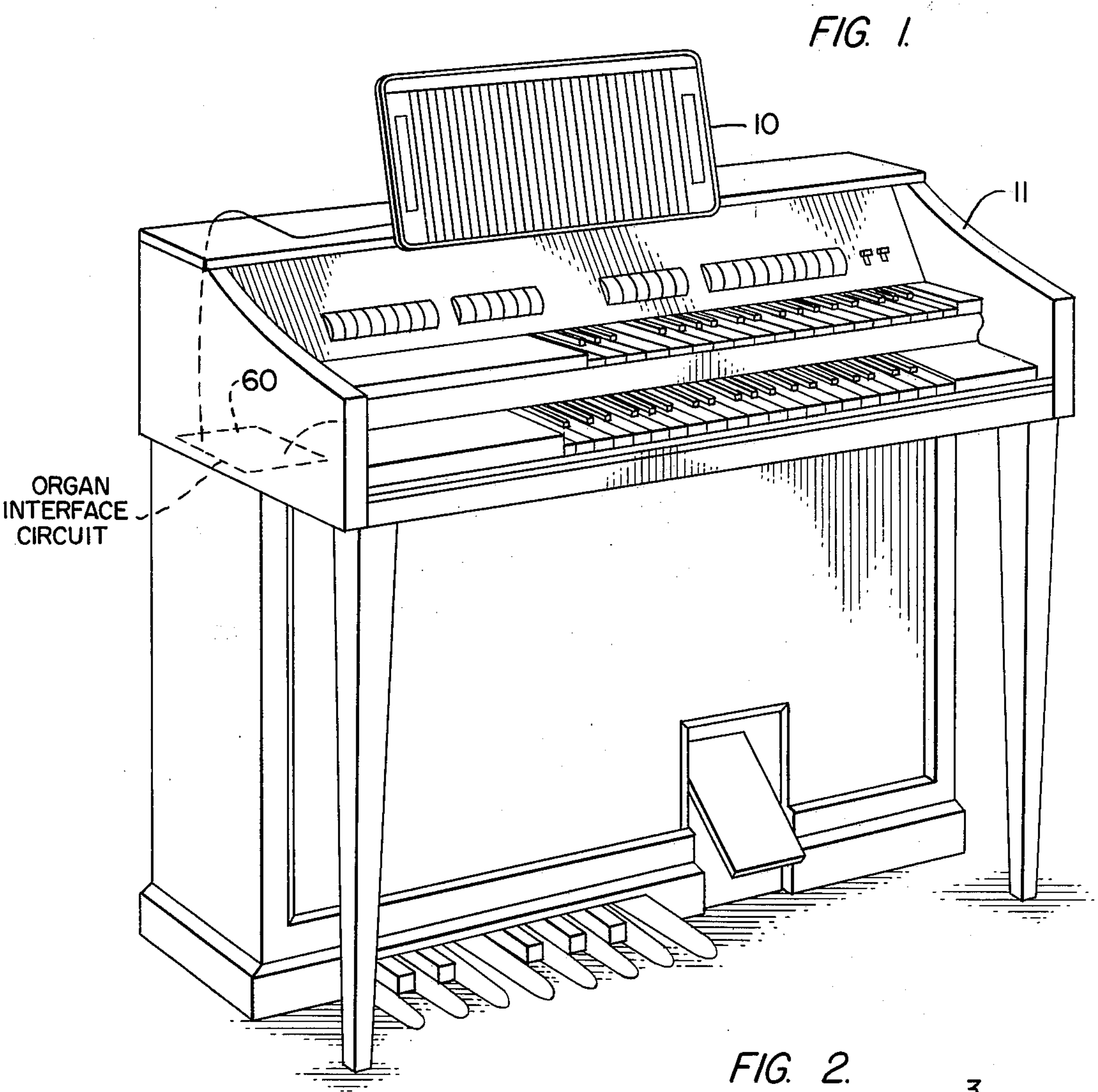
FIG. 1 is an overall perspective view of a display panel of the present invention mounted on an electronic organ.

Referring first to FIG. 1, there is shown an overall view of display panel 10 of the optical metronome of the present invention positioned at the music rack or in place of the music rack of electronic organ 11 so that a sheet of music positioned thereon can be comfortably read by a person seated at organ 11.

Figure 2:
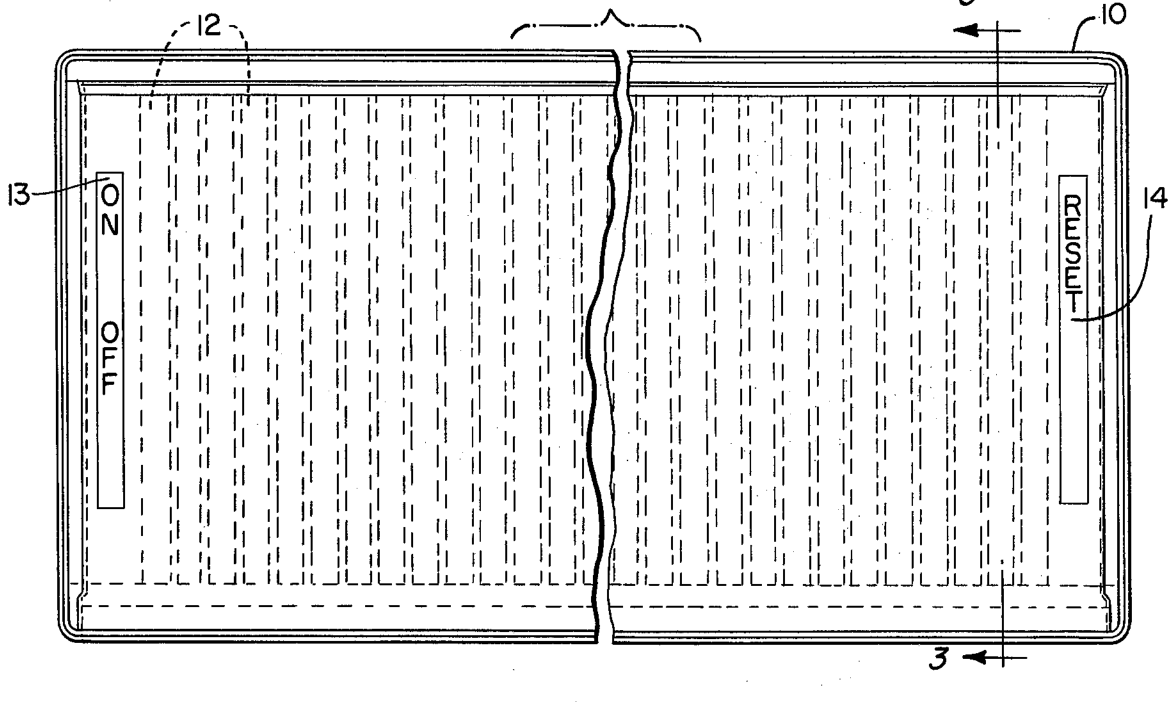
FIG. 2 is an enlarged front view of the display panel alone of FIG. 1.

FIG. 2 shows the display panel 10 somewhat enlarged so as to clearly illustrate the placement of columns 12 which appear from behind a sheet of music placed on the front of display panel 10 and which are lighted in sequence to designate the notes to be played. Also shown in display panel 10 are on-off bar 13 and reset bar 14 to control those respective functions manually.

Figure 3:
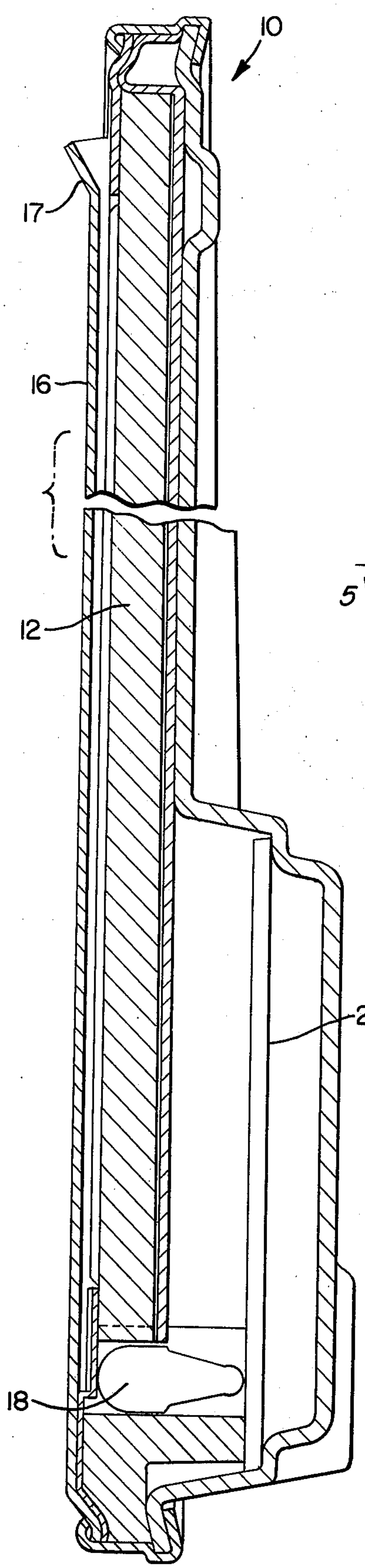
FIG. 3 is a side sectional elevation further enlarged taken along line 3—3 of FIG. 2
Figure 4:
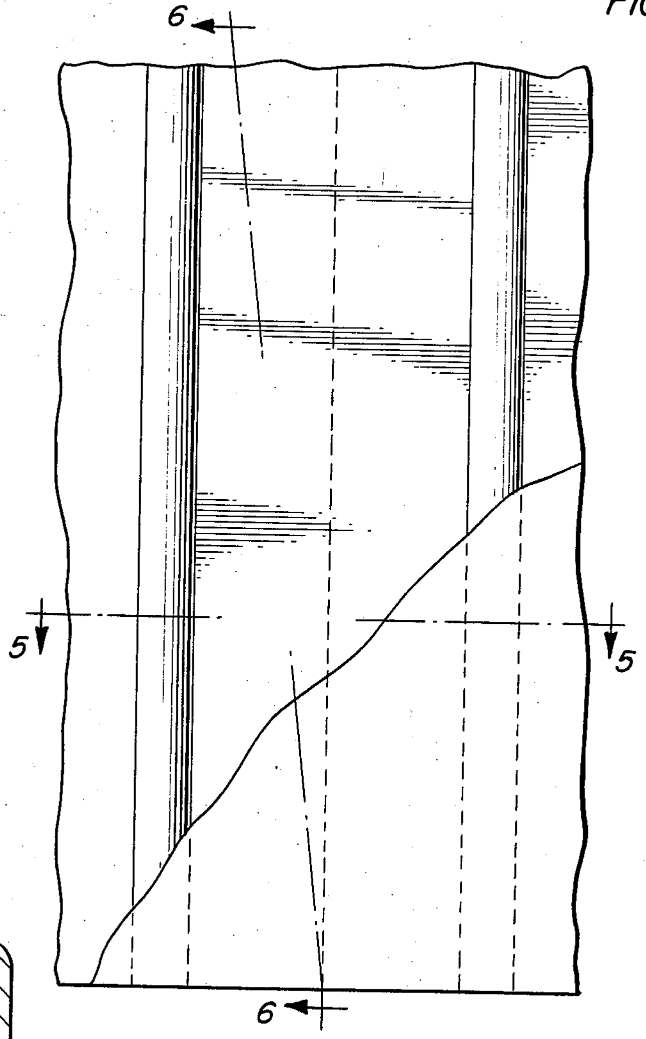
FIG. 4 is an enlarged partial front elevation of the display panel of FIG. 2.
Figure 6:
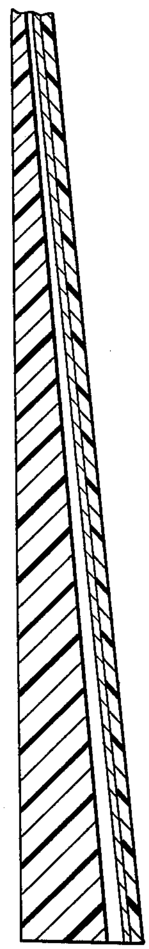
FIG. 6 is a side elevation along line 6—6 of FIG. 4.
Figure 5:
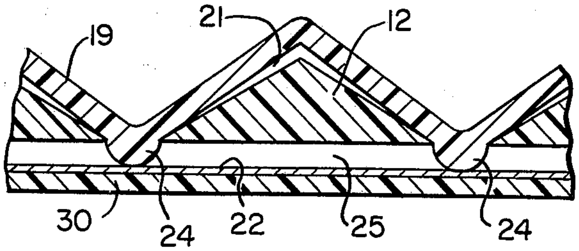
FIG. 5 is a horizontal sectional view along line 5—5 of FIG. 4.
Figure 7:
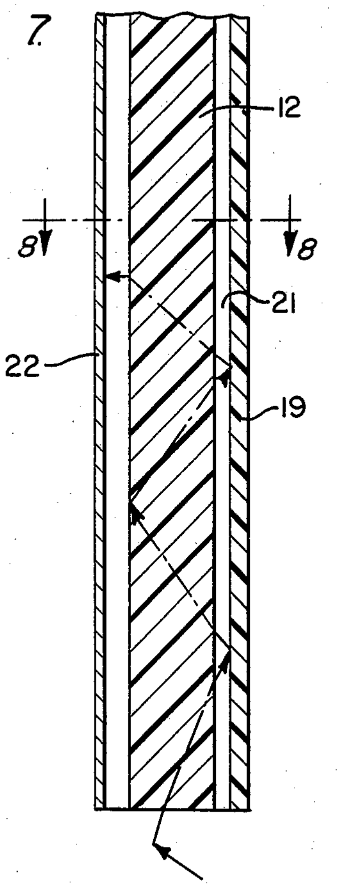
FIG. 7 is a side elevation of a bar and surrounding parts of a display panel.
Figure 8:
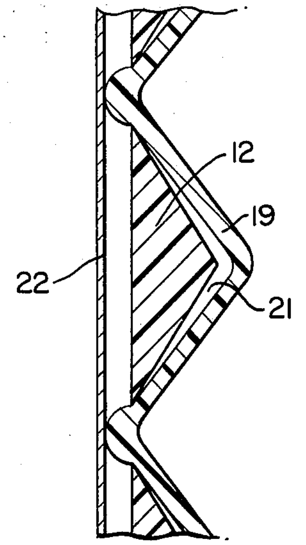
FIG. 8 is a horizontal section along line 8—8 of FIG. 7.

FIG. 3 is an enlarged, side sectional elevation taken along lines 3—3 of the display panel 10. A front transparent panel 16 with an outwardly flanged top portion 17 is located in front of panel 10 to receive a sheet of music between it and the columns formed by light bars 12. Details of light bars 12 and their placement in the panel are further shown in FIGS. 4–8. Below each of light bars 12 is located a lamp 18. The light bars 12 have a shape of a triangular cross section tapered toward the top as shown in FIGS. 4, 5 and 6.

In one embodiment, the light bar 12 is formed of a clear plastic of the "plexiglass" type, having a general characteristic in that the angle of refraction is approximately 42.2°. This implies that a light ray impinging on the plastic surface, on the inside, at an angle less than 42.2° will escape to the outside. All others will be reflected inside. Therefore, if the sides of the plastic are tapered, any light presented at the bottom of a light bar will shine out the sides of the bar. To make this practical for display purposes, the angle should be a minimum of 6°. For a reasonable length bar with a very narrow top the bottom would appear to be quite wide. In the case of the present invention it would become too wide to become practical. If, however, the bar is constructed of uniform triangular cross section as illustrated in the figures, a ray from a single light source will always travel in a plane which is tapered. Further, if the bar 12 is nested in a light reflector 19 so that an angular air gap 21 exists between the bar 12 and the reflector 19, along its length, any light escaping from the back of bar 12 is immediately reflected back at such an angle as to pass through to the front of bar 12. The top of the bar may be highly polished and covered by white reflecting material to divert top light back into the bar. Finally, if a translucent screen 22 is placed adjacent to the front faces of bars 12, the uniformly distributed light from the bar shows on the face of the screen as a well defined illuminated pattern to anyone viewing the screen from the front.

Translucent screen 22 may have the musical notation printed directly thereon. Screen 22 will give excellent results if it is a non-sagging translucent sheet of plastic such as polystyrene. A high impact lithograde polystyrene with a thickness of 9 points with a tolerance ±1 and an opacity of 50% with a tolerance of ±15% gives very satisfactory results.

It is best for the material to be non-sagging so as to provide the flattest surface possible between vertical bosses 24. This allows a predetermined spacing 25 to be maintained between the front of bar 12 and the back of screen 22. With sufficient rigidity of screen 22 it is possible to eliminate front transparent panel 16 and merely locate screen 22 with its musical notation thereon in a frame or partial frame on display panel 10.

With a series of light bars 12, as described above, placed vertically and adjacent to each other, with each bar 12 independently lighted from single light sources or lamps 18 at the bottom, the lights 18 are turned on and off in sequence causing the bars 12 to light independently and serially. To the viewer this presents itself as an illuminated vertical strip marching across the screen 22. With the light sources 18 switched in a time sequence by electronic means to be described later, the illuminated vertical strips will march across the screen at an even tempo. The device thus becomes a visual metronome when the switching tempo is suitable for a musical composition. The device can be used as a visual metronome for any instrument by driving the switching means with an electronic timing circuit and, if desired, an audible sound can be added which audibly denotes the "downbeat" of the tempo.

If musical notes and symbols are inscribed on the face of the translucent screen 22 or more practically on a sheet of music 30 placed in front of translucent screen 22, in a proper geometrical pattern to form a musical composition, it is possible to so place the notes that the lighted pattern is behind a particular note in proper tempo when it should be played. This is illustrated in part in FIG. 9. For example, if a quarter note is placed in front of each bar of light, any combination of notes equalling a quarter note, i.e. two eighth notes, must also occupy one lighted bar width. The same is true for all combinations of notes and rests occupying one bar width. A full note would be placed in front of a lighted bar with the next note occurring in front of the fourth adjacent lighted bar in sequence. In this manner a musical measure in three-quarter time would be three light bar widths long while the measure in four-quarter time would occupy four light bar widths. It should be noted that the same measure on each staff of the composition must begin in vertical alignment with the appropriate light bar. Therefore, there is vertical alignment of the measures.

Figure 9:
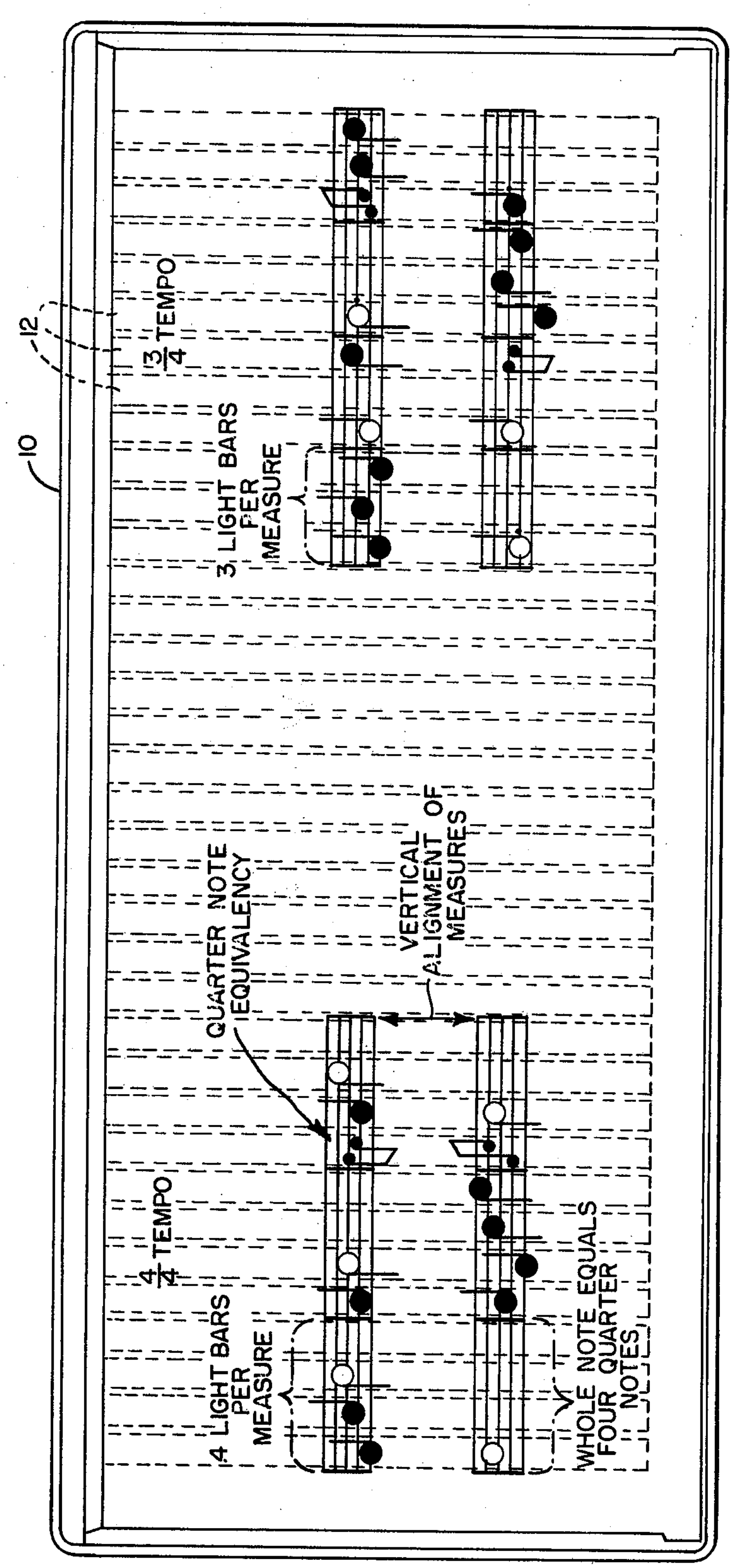
FIG. 9 is a front view of a display panel showing alignment of music notation on the panel.

FIG. 9 illustrates the combining of thirty-six light bars which allows for a sheet of music to have twelve measures of three-quarter tempo or nine measures of four-quarter tempo combined with switchable light sources 18 for each bar 12 and driving the switching circuit as described in the description of the circuitry below. The novice player need only play each note as it is illuminated by the light bar in order to perform musical composition to tempo. If the beginner fails to perform in tempo by losing his place, a switch has been provided to reset or return the light to the first bar in the sequence allowing the player to start over again. Also since the downbeat is audibly indicated by circuitry below and must occur at the beginning of each measure, a switch has also been provided to denote downbeat every third lighted bar for three-quarter tempo and every fourth lighted bar for four-quarter tempo.

Figure 13:
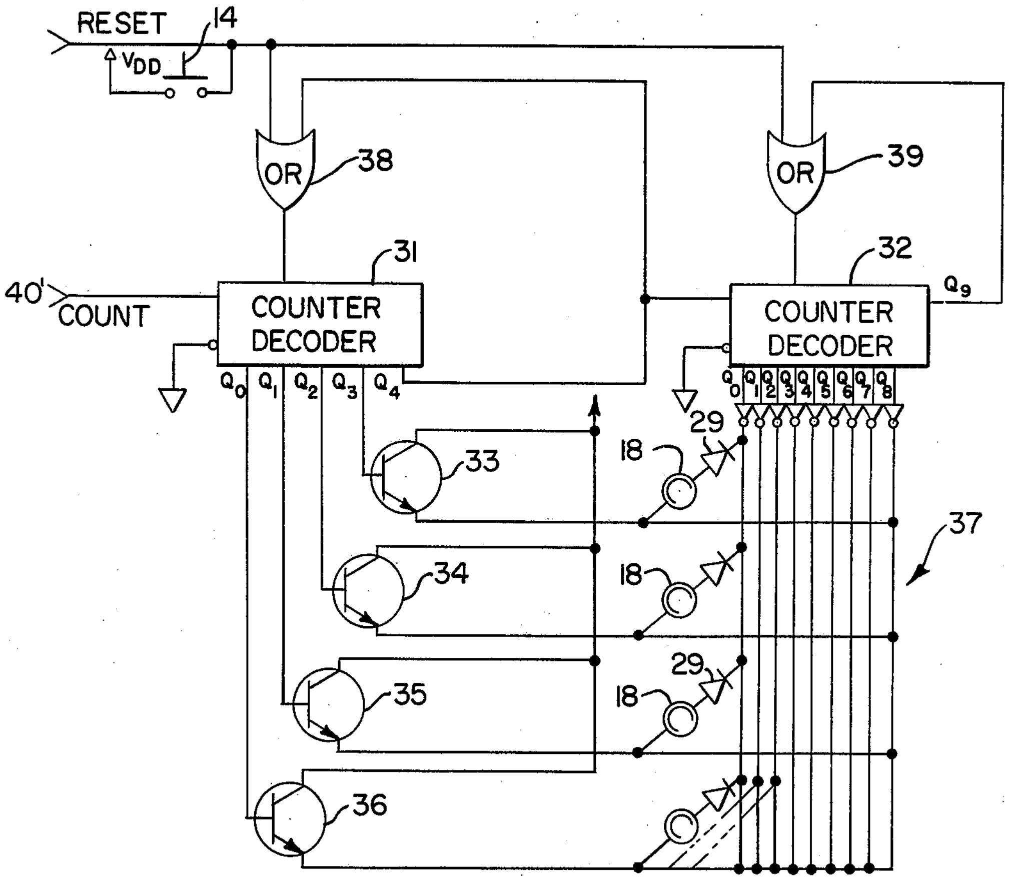
FIG. 13 is a circuit diagram of a display panel circuit.
Figure 10:
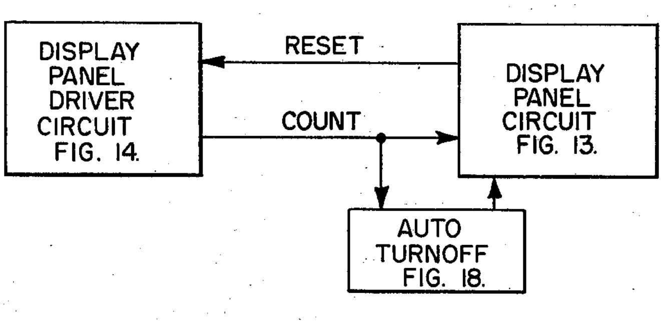
FIG. 10 is a block diagram of overall circuit connections of a stand alone unit not connected into an organ.

In one embodiment of the present invention the display panel 10 may form a part of an integral or "stand alone" unit as in the block diagram of FIG. 10 capable of guiding and/or instructing the player in proper musical tempo. In this case the display panel would be connected to a power source and not conncted to an internal portion of the organ as shown in FIG. 1. In such a case, the display panel circuit of FIG. 13 is driven by the driver circuit of FIG. 14 for this "stand-alone" mode. In such a case the electronic circuitry may be formed on a printed board 23 shown in FIG. 3.

Figure 11:
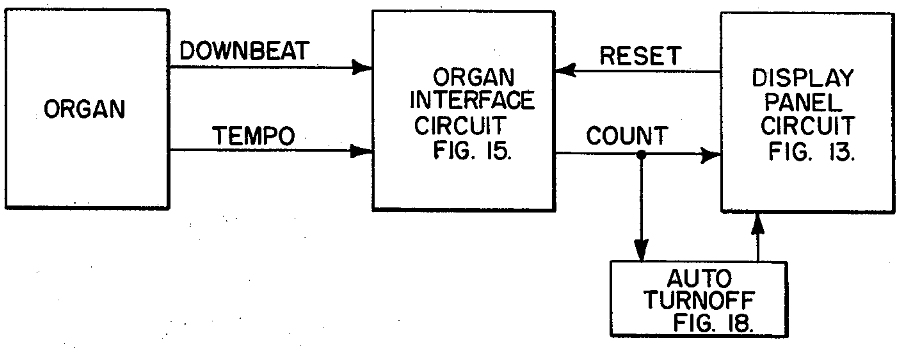
FIG. 11 is a block diagram of overall circuit connections of a unit connected into an organ circuitry for an organ with a rhythm unit in which the clock always operates.

The modern electronic organ is ideally suited to the use of the optical metronome of the present invention since various rhythm patterns are generated within the organ circuitry. By coupling the display panel circuit of FIG. 13 to the organ rhythm circuitry using interface circuit of FIG. 15 as shown by the block diagram of FIG. 11, the organ supplies tempo pulses and downbeat pulses to the scanner. With musical scores inscribed on the front translucent screen the combination becomes an ideal integral device to aid the player in matching his tempo with the rhythm patterns produced by the organ in an organ with the clock always running.

Figure 16:
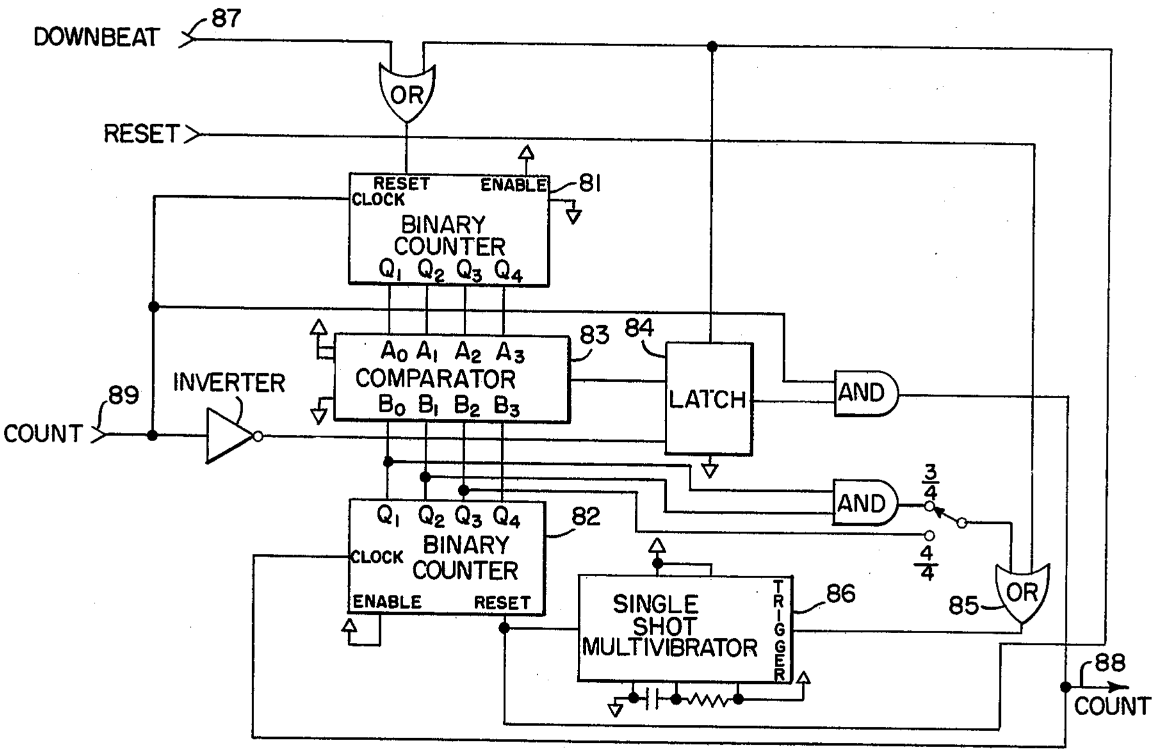
FIG. 16 is a circuit diagram of a resynchronization circuit.

Some modern organs have the feature that the start of the rhythm pattern is under the control of the player as in a follow-me mode. This means that the player can mistakenly force a downbeat to occur in the middle of a measure and be out of synchronization with the optical metronome. To accommodate this eventuality a resynchronization circuit of FIG. 16 is added to the interface circuit of FIG. 15 which causes the light bar progress on display panel 10 to stop until a sufficient number of beats of the rhythm pattern has played and the system in again synchronized so that as the light bars 12 renew their progress the "downbeat" will occur properly at the beginning of each measure. The connection of the circuits for this follow-me mode is illustrated by the block diagram of FIG. 12.

The display panel circuit of FIG. 13 illustrates lamps 18 arranged in a 4 × 9 configuration. Other configurations such as 6 × 6, 9 × 4, 12 × 3, and 18 × 2 would also be usable.

A pair of counter decoders 31 and 32 have only one output of each of them in a high state under any operating condition. Counter decoder 31 has stable states with $Q_0$, $Q_1$, $Q_2$ or $Q_3$ high. Each of these outputs is connected to a transistor 33 through 36 as an emitter follower. The emitter follower multiplies the available current to the lamp matrix 37 composed of all the lamps 18. Since only one output may be high at any one time, only one transistor of transistors 33 through 36 will have an output which will be at a positive voltage.

When the $Q_4$ output of counter 31 goes high, two things occur. First, the high output connects to the count input of counter 32 causing it to increment by one. Secondly, delayed by the OR gate 38, the output of $Q_4$ from counter 31 through OR gate 38 reset counter 31 causing its $Q_0$ output to go high. This permits the first counter 31 to repeat its pattern.

A second counter 32 has nine stable states, $Q_0$ through $Q_8$. Only one of the $Q_0$ through $Q_8$ outputs may be high at any one time. These nine outputs are connected to transistors 33 through 36 in such a manner as to cause one output from one transistor to go low. Since each of the transistors is connected to nine lamps, each of which is connected to one of the counter 32 outputs, only one lamp 18 will have a high on one side and a low on the other with the diodes 29 blocking reverse currents flow. This will permit current to flow through only one lamp 18 causing it to light. The decoded outputs are arranged as follows:

00, 01, 02, 03, 10, 11, 12, 13, 20, 21, 22, 23, . . . 80, 81, 82, 83, 00.

The transition from 83 to 00 caused by the first counter 31 achieving non-stable state $Q_4$ true and the second counter 32 achieving non-stable state $Q_9$ causing it to reset itself to the $Q_0$ true state through OR gate 39.

With the "stand-alone" unit, which is one embodiment of the present invention, illustrated in FIG. 10, the driver circuit of FIG. 14 provides count commands to the display panel circuit of FIG. 13 at input 40' from count output 40 of FIG. 14 when no organ rhythm section is to be used.

The rhythm timer or oscillator 41 of the driver circuit of FIG. 14 has an adjustable period to permit generating pulses every 1/16th of a measure or period of time with a repetition rate range equivalent to the desired variations in tempo. This 1/16th note pulse train is divided down to quarter notes in the first two stages of counter 42. The third stage increments each quarter note and the fourth stage increments each half note. When the second stage changes state this transition is differentiated and then is connected to AND gate 43 along with the output of audio generator 44 which operates at approximately 2,000 Hertz. During the decay time of the differentiated transition, the output of audio generator 44 is gated through AND gate 43 into a transistor 45, the collector of which is connected through a resistor 46 to a speaker 47. This generates an audible "tick" similar in character to the sound of a clave.

When all four stages of counter 42 go low on RESET, this is recognized by a four input NOR gate 48 which then does two things. First, it sets a flip-flop 49 to remove an inhibit from a two input AND gate 51 also known as a count gate. Secondly, the output from NOR gate 48 is differentiated, passed to AND gate 52 which also receives an output from audio generator 44 with the resultant output from AND gate 52 amplified in transistor 53 to drive speaker 47. The current limiting resistor in series with this transistor is of such value as to cause the speaker 47 to give a louder tick than due to the output of transistor 45.

The 3/4-4/4 switch 54 causes counter 42 to reset to zero every third or every fourth beat or pulse depicting a quarter note, a condition which is equivalent to the rhythm pattern of three-quarter or four-quarter time. Flip-flop 49 is used to inhibit the count command until the first quarter note after a downbeat, state 0000 is generated at counter 42. This causes the audible downbeat emphasized kick to occur simultaneously with the count command causing a lamp to light on the first note of a measure. The reset pulse from RESET switch 14 in FIG. 13 initializes the system, as well as resetting the display panel circuit to the 00 state. Audio on/off switch 56 permits muting of speaker 47.

FIG. 15 discloses an embodiment of an organ interface circuit 60 connected between a display panel circuit as exemplified in FIG. 13 which may be built into display panel 10, and the internal workings of an organ such as the Conn electric band or such type electric organ where the clock never stops. These interconnections are illustrated in the block diagram of FIG. 11. Upon operation of RESET bar 14, shown schematically in FIG. 13, a reset pulse is received at reset input 61 of the interface circuit of FIG. 15 which resets flip-flops 62, 63 and 64 and the tempo divider counter 65. This affects the NOT Q output 66 of flip-flop 62 and keeps the tempo divider counter 65 reset until the NOT Q output 66 goes low. Flip-flop 62 is clocked into a set condition when the input 70 of the downbeat goes high. At this time the NOT Q 66 will go low and the Q output 67 of flip-flop 62 will go high. This removes the reset from tempo divider 65. Tempo divider 65 will now begin to count with the count increasing by one for each positive transition of the "tempo" input 68. The rhythm unit of a typical electronic organ generates pulses which may divide a whole interval or measure into twenty-four equal pulses such as are applied at tempo input 68. Thus to obtain four pulses for a measure at output 69 of tempo divider 65, a division ratio of six is needed. A counter 65 starts with $Q_0$ high and successively the $Q_1$, $Q_2$, $Q_3$, $Q_4$ and $Q_5$ will go high, each for 1/14th of a measure. When the $Q_6$ output which is output 69 goes high, this condition is sent to the clock inputs of flip-flops 63 and 64 and to AND gate 71, and also back through NOR gates 72 and 73 respectively into the reset terminal 74 of tempo divider 65. Once the counter 65 is reset it will repeat this pattern.

The $Q_6$ output of tempo divider counter 65 clocks the flip-flop 63 to a set condition agreeing with the output of flip-flop 62. Flip-flop 64 is still in a reset condition inhibiting the AND gate 71. Upon the next positive transition of the $Q_6$ output 69, flip-flop 64 will set to agree with flip-flop 63. This places a high on one input pin of the AND gate 71. The same pulse that sets flip-flop 64 is connected to the other input of AND gate 71. With one input now held high and the other input pulse high when $Q_6$ goes high, the output of AND gate 71 will pulse high, generating a "count" command. The purpose of the inhibits generated by flip-flops 62–64 is to prevent a count command being generated unit the first quarter note of the next measure.

Figure 12:
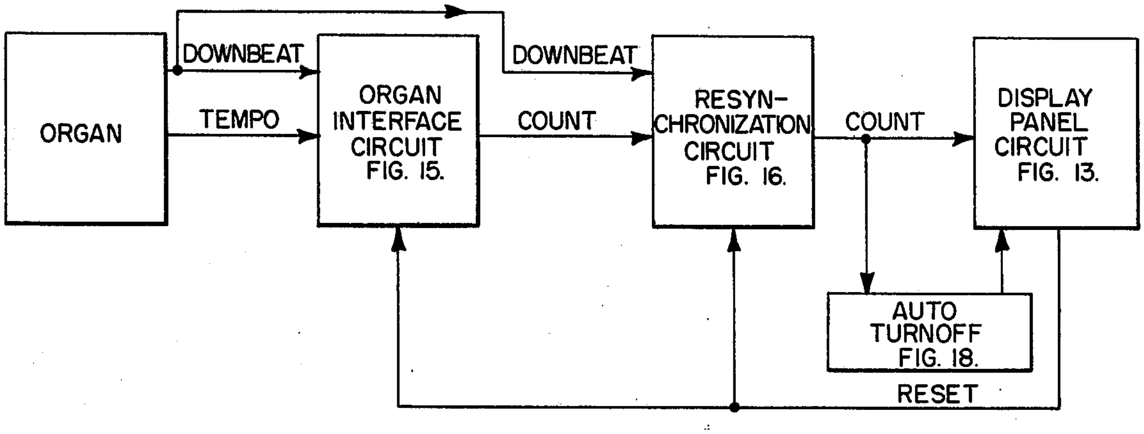
FIG. 12 is a block diagram of overall circuit connections of a unit connected into an organ circuitry in an organ with a follow-me mode for a rhythm unit.

FIG. 16 denotes schematically resynchronization circuitry which may be incorporated in the embodiment of the present invention wherein connection is made into the electronic system of the organ in the follow-me mode illustrated by FIG. 12. The device of the present invention is required to increment one count per quarter note and to light the first quarter note of each measure in conjunction with the downbeat. Since many electronic organs have a mode of operation known as a follow-me mode which results in a downbeat's being generated as soon as a chord is selected, downbeats may occur at any time at the discretion of the player. This without correction would violate the second criterion wherein the device of the present invention lights with the first quarter note of each measure in conjunction with the downbeat. The resynchronization circuit of FIG. 13 intends to cause clock or count pulses received from the interface unit of FIG. 15 to be inhibited for any required number of pulses until the organ rhythm pattern is back in synchronization with the current location of the lighted display bar. Then the count pulses are again enabled and delivered at output 88 of the resynchronization circuit of FIG. 16. The result is that within a maximum of one measure the audible rhythm of the organ and the display, lighted note are back in agreement where the downbeat occurs at the beginning of the measure together with the light on the first quarter note.

Two binary counters 81 and 82 are used. Their states are compared by comparator 83. To avoid extraneous signals from affecting the logic, the output of comparator 83 is stored by latch 84 at a time other than the instant the counters 81 and 82 are incremented. Counter 82 is reset by a full measure count or by a reset pulse such as is received from operation of reset bar 14 received through OR gate 85 and single shot multivibrator 86. Counter 81 is reset by either a downbeat signal received at input 87 from the organ or by either of the signals stated for resetting counter 82. Should a downbeat occur between the time the second quarter note of a measure occurs and the last quarter note of a measure, counters 81 and 82 will have unequal count. Under this condition comparator 83 produces an output which indicates the inequality and this inequality fed to latch 84 is stored therein. When the latched condition in latch 84 shows an inequality, the counter, either 81 or 82, which is not reset by a downbeat does not receive count pulses nor does a count pulse go to the display panel 10 from output 88, until such time as the counts have again reached agreement, the agreement condition has been latched, and the next quarter note pulse occurs at tempo or count input 89 received from count output 89' of the interface circuit of FIG. 15.

Lamps 18 in the display panel 10 dissipate in excess of a watt of energy. Since they are in an evironment where heat may not be transferred to free air, it is undersirable to leave one lamp on for an extended period of time, as that would result in bulb darkening or light bar deformation, either of which results in lower illumination from the display panel 10.

Figure 18:
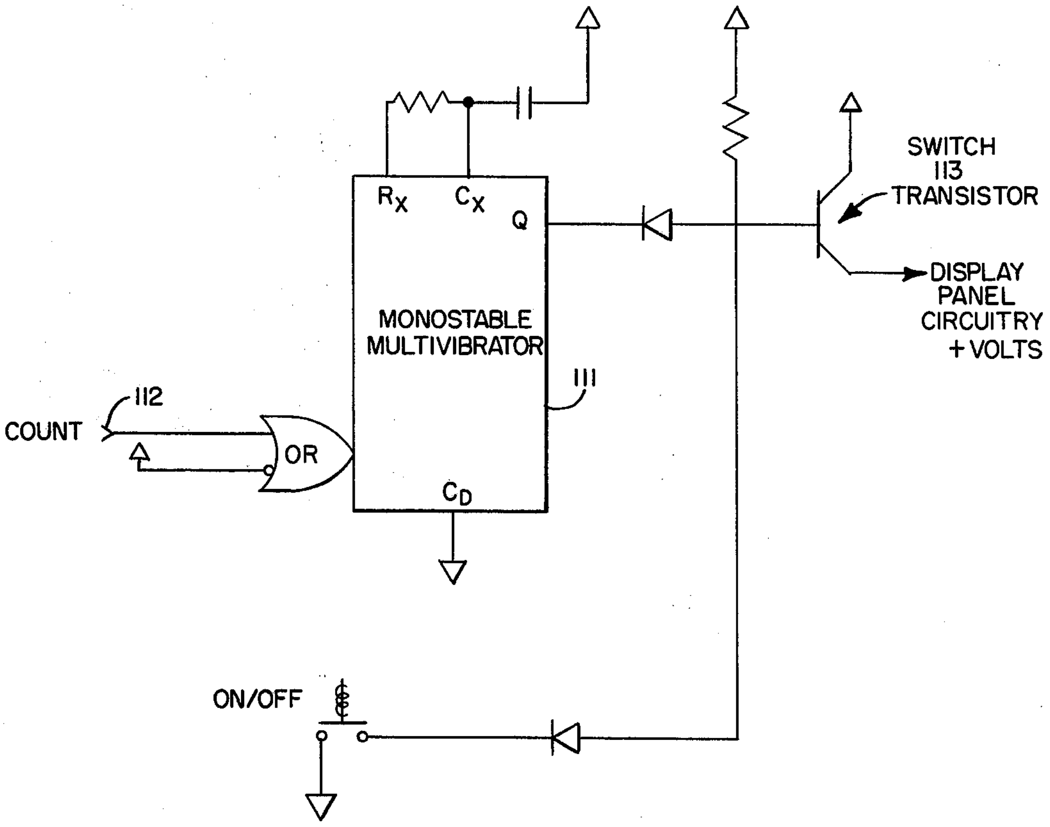
FIG. 18 is a schematic circuit diagram of an automatic turn-off system used with the optical metronome of the present invention.

The present invention increments on positive going pulses. Failure to receive such pulses results in one lamp 18 remaining illuminated, with the above-noted undesirable consequences. To avoid this, an automatic turnoff circuit illustrated in FIG. 18 with a mono-stable multivibrator 111 has been connected to operate as a missing pulse detector. This multivibrator 111 is triggered by each input pulse at count input 112 connected to any source of a count pulse. It is retriggerable. Normally quarter note pulses occur about once per second. When the resynchronization circuit of FIG. 13 is waiting for an organ rhythm pattern to catch up to the location within a measure of the currently illuminated lamp, count pulses are inhibited. This prevents the metronome from incrementing. When this happens, one lamp may remain on for a period of up to three or four quarter notes. This is normal. However, since some electronic organs turn off their clocks when no bass chord is selected, it becomes possible to leave one lamp turned on indefinitely. If the circuit of the present invention does not receive a pulse within about 10 seconds, it times out, and removes power from the lamp circuit by switching off transistor 113 and thus removing positive volts from display panel circuitry thus preventing continued illumination and its consequent heat damage.

Figure 17:
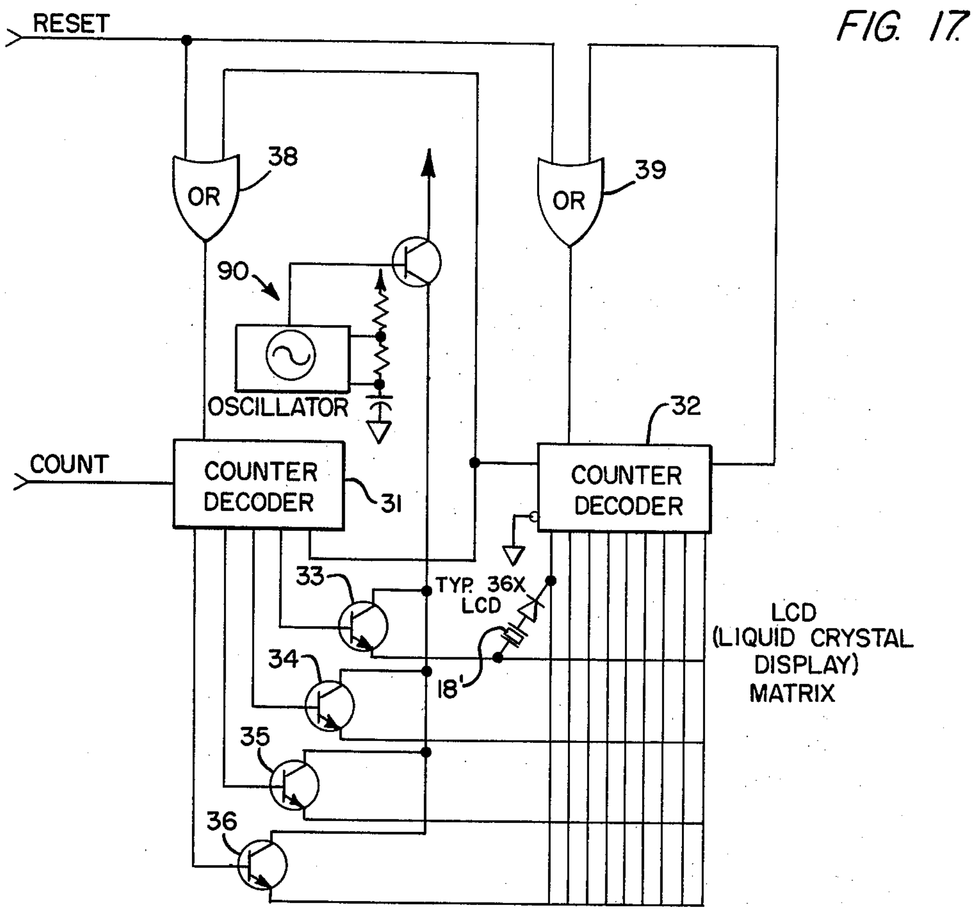
FIG. 17 is an alternate lighting circuit using a liquid crystal display.

FIG. 17 is a display panel circuit somewhat similar to that shown in FIG. 13 except that the display panel circuit of FIG. 17 uses a glass panel, with vertical light bars taking the form of a liquid crystal display requiring the modifications of circuitry shown in FIG. 17. In FIG. 17 36 individual liquid crystal display bars 18' replace the 36 incandescent lamps 18 of FIG. 13. In addition, a pulsing circuit 90 shown comprising an oscillator and transistor with other circuitry is required to supply the "strobe" direct current required to operate such a liquid crystal display. In all other respects the operation is identical to the version described above employing triangular bars or columns 12 with single incandescent light sources 18.

Figure 19:
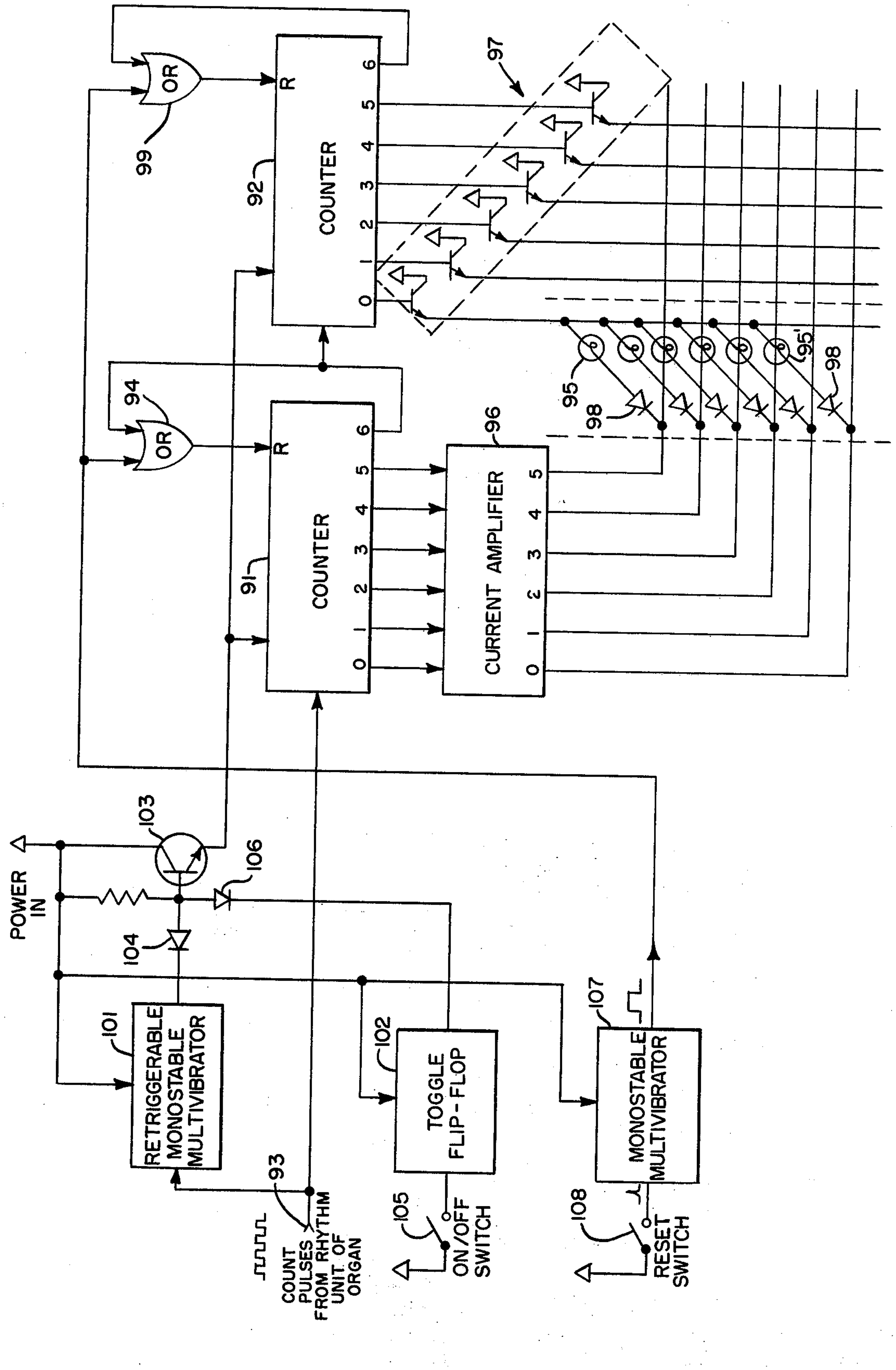
FIG. 19 is a block diagram for a simplified display panel operating circuit.

FIG. 19 presents a somewhat condensed version of the circuitry of other embodiments already described but does not contain all of the functions of the previous circuitry since these functions appear to have been lost in the condensation. But despite this condensation, the circuitry will still perform certain essential functions for operation of the display panel 10. The lamps are again lighted in sequence as described before. To perform this the counters 91 and 92 are connected as six-stage counters with outputs "0" through "5". When the counters 91 and 92 are in the reset position, outputs "0" of both counters are in a logic high state (ON) with all other outputs logically low (OFF). As count pulses enter counter 91 from the rhythm unit of the organ at input 93, each output of counter 91 (0 to 5) goes high (ON) in turn and the preceding output goes low (OFF), therefore, only one output is high at any time. On the seventh pulse input from input 93, output "6" of counter 91 goes high (ON) and at this time counter 92 advances from output "0" to output "1" of counter 92. At the same instant, counter 91 is reset through the OR gate 94. Therefore at the seventh count pulse, effectively counter 91 output "0" is high (ON) and counter 92 output "1" is high (ON). That is, every time counter 91 steps through its six outputs (0 to 5) counter 92 advances one output. There are 36 different output combinations to drive ∓lamps 95 of display panel 10. In FIG. 19 only six of the 36 lamps 95 are shown thereon but a matrix of the lamps is connected similarly to those shown. At the 36 count pulse from input 93, both counters 91 and 92 are in the reset state with the first lamp 95' lit.

Current amplifier 96 and the six transistors 97 at the outputs of counter 92 are current amplifiers which support the drive current for the lamps 95 (and 95'). Diodes 98 in series with each lamp 95 and 95' prevents current flow in the wrong direction.

Automatic turn on/off switch circuits 101 and 102 prevent lamp damage in the absence of count pulses from the rhythm unit of the organ. Switch circuit 101 is a retriggerable monostable multivibrator with its output in a logically high state (positive voltage) as long as count pulses are present at its input from pulse input 93. If no count pulses are present, the output of switch circuit 101 goes low (OFF) which turns off transistor 103 through diode 104. Power to counters 91 and 92 is supplied by transistor 103 which turns off in the absence of count pulses. Circuit 102 is a toggle flip-flop which changes its output state from off to on and on to off every time the on/off switch 105 is actuated. The output of switch circuit 102 is also connected to transistor 103 through diode 106. If its output is low (OFF), transistor 103 is turned off which turns off power to counters 91 and 92. Therefore, in order to supply power to 91 and 92, the outputs of switch circuits 101 and 102 must be in the high state (ON). A reset switch function is obtained through monostable multivibrator 107 which supplies a longer positive pulse at its output everytime reset switch 108, which is similar to reset bar 14, is actuated. The reset pulse from reset switch 108 and from multivibrator 107 goes to the inputs of OR gates 94 and 99 which resets both counters 91 and 92 to their reset state this means that counters 91 and 92 start again with highs 00. The sequence then continues in a manner such as 10, 20, 30, 40, 50, 01, 11, 21, 31, . . . 05, 15, 25, 35, 45, 55, 00, 01 . . . .

It will be obvious to those skilled in the art that various changes may be made without departing from the scope of the invention and the invention is not to be considered limited to what is shown in the drawings and described in the specification.

What is claimed is:

1. An optical metronome for designating visually the note of music to be played comprising display panel means receiving a tempo or count pulse to sequentially illuminate the notes to be played in relation to the timing designated for the musical notation, a sheet of music with the musical notation thereon located in front of said display panel means for sequential illumination by said display panel means, said display panel means including a plurality of vertical bars placed side by side forming a series of vertical columns in said display panel means light sources associated with each of said vertical bars located at an end of said bars, means to light each of said light sources in sequence in accordance with said tempo or count pulse received by said display panel means.

2. The optical metronome of claim 1 further characterized by said vertical bars having a triangular horizontal cross section.

3. The optical metronome of claim 2 further characterized by said vertical bars having three vertical faces, a V-shaped reflector behind two of said vertical faces and spaced in part at least therefrom.

4. The optical metronome of claim 3 further characterized by said sheet of music spaced from the third of said vertical faces a predetermined distance to allow a substantially sharp outline of said bar to show through said sheet of music

5. The optical metronome of claim 3 further characterized by said vertical bars being tapered toward their portions away from said light sources.

6. The optical metronome of claim 3 further characterized by said light sources being liquid crystal displays.

7. The optical metronome of claim 1 further characterized by said sheet of music being a non-sagging sheet of translucent material with the musical notation marked thereon.

8. The optical metronome of claim 7 further characterized by said sheet of music being of polystyrene.

9. The optical metronome of claim 8 further characterized by said sheet of music being of approximately 8 to 10 points in thickness with an opacity of approximately 35% to 65%.

* * * * *